(12) United States Patent
Piehler

(10) Patent No.: US 10,338,281 B2
(45) Date of Patent: Jul. 2, 2019

(54) LIGHTING DEVICE FOR GESTURE RECOGNITION APPARATUS

(71) Applicant: Jabil Optics Germany GmbH, Jena (DE)

(72) Inventor: Eberhard Piehler, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 127 days.

(21) Appl. No.: 15/496,847

(22) Filed: Apr. 25, 2017

(65) Prior Publication Data

US 2017/0315275 A1 Nov. 2, 2017

(30) Foreign Application Priority Data

Apr. 29, 2016 (DE) .................. 10 2016 108 040

(51) Int. Cl.
| | | |
|---|---|---|
| *F21V 5/02* | (2006.01) |
| *G02B 5/04* | (2006.01) |
| *F21V 13/04* | (2006.01) |
| *G06F 3/042* | (2006.01) |
| *G06K 9/00* | (2006.01) |
| *G02B 26/10* | (2006.01) |
| *G02B 27/28* | (2006.01) |
| *G02B 27/00* | (2006.01) |
| *F21V 7/00* | (2006.01) |
| *G02B 19/00* | (2006.01) |
| *G06F 3/01* | (2006.01) |
| *G02B 27/12* | (2006.01) |

(52) U.S. Cl.
CPC ................ *G02B 5/04* (2013.01); *F21V 13/04* (2013.01); *G02B 26/101* (2013.01); *G02B 26/105* (2013.01); *G02B 27/0093* (2013.01); *G02B 27/283* (2013.01); *G06F 3/0425* (2013.01); *G06K 9/00355* (2013.01); *F21V 5/02* (2013.01); *F21V 7/00* (2013.01); *G02B 19/0028* (2013.01); *G02B 27/126* (2013.01); *G06F 3/011* (2013.01); *G06F 3/017* (2013.01)

(58) Field of Classification Search
CPC ...... G02B 5/04; G02B 26/101; G02B 26/105; G02B 27/0093; G02B 27/283; G02B 19/0028; G02B 27/126; F21V 13/04; F21V 5/02; F21V 7/00; G06F 3/0425; G06F 3/011; G06F 3/017; G06K 9/00355
See application file for complete search history.

(56) References Cited

U.S. PATENT DOCUMENTS

| | | | | |
|---|---|---|---|---|
| 6,340,230 B1* | 1/2002 | Bryars | ................ | G02B 27/283 348/E5.141 |
| 2011/0292505 A1* | 12/2011 | Kurtz | .................... | G02B 7/028 359/489.14 |
| 2012/0140243 A1 | 6/2012 | Colonna de Lega | | |

FOREIGN PATENT DOCUMENTS

| | | |
|---|---|---|
| DE | 103 17 828 B3 | 9/2004 |
| DE | 10 2004 015 866 A1 | 10/2005 |
| WO | 2006/021205 A1 | 3/2006 |

* cited by examiner

*Primary Examiner* — Bao Q Truong
(74) *Attorney, Agent, or Firm* — Young Basile Hanlon & MacFarlane, P.C.

(57) ABSTRACT

Described is a lighting device for detecting three-dimensional structures, in particular for a gesture recognition apparatus, as well as a gesture recognition apparatus having a lighting device. In order to be able to compactly construct the lighting device, the lighting device includes a prism through which illumination light (L) passes twice in order to illuminate a gesture.

12 Claims, 1 Drawing Sheet

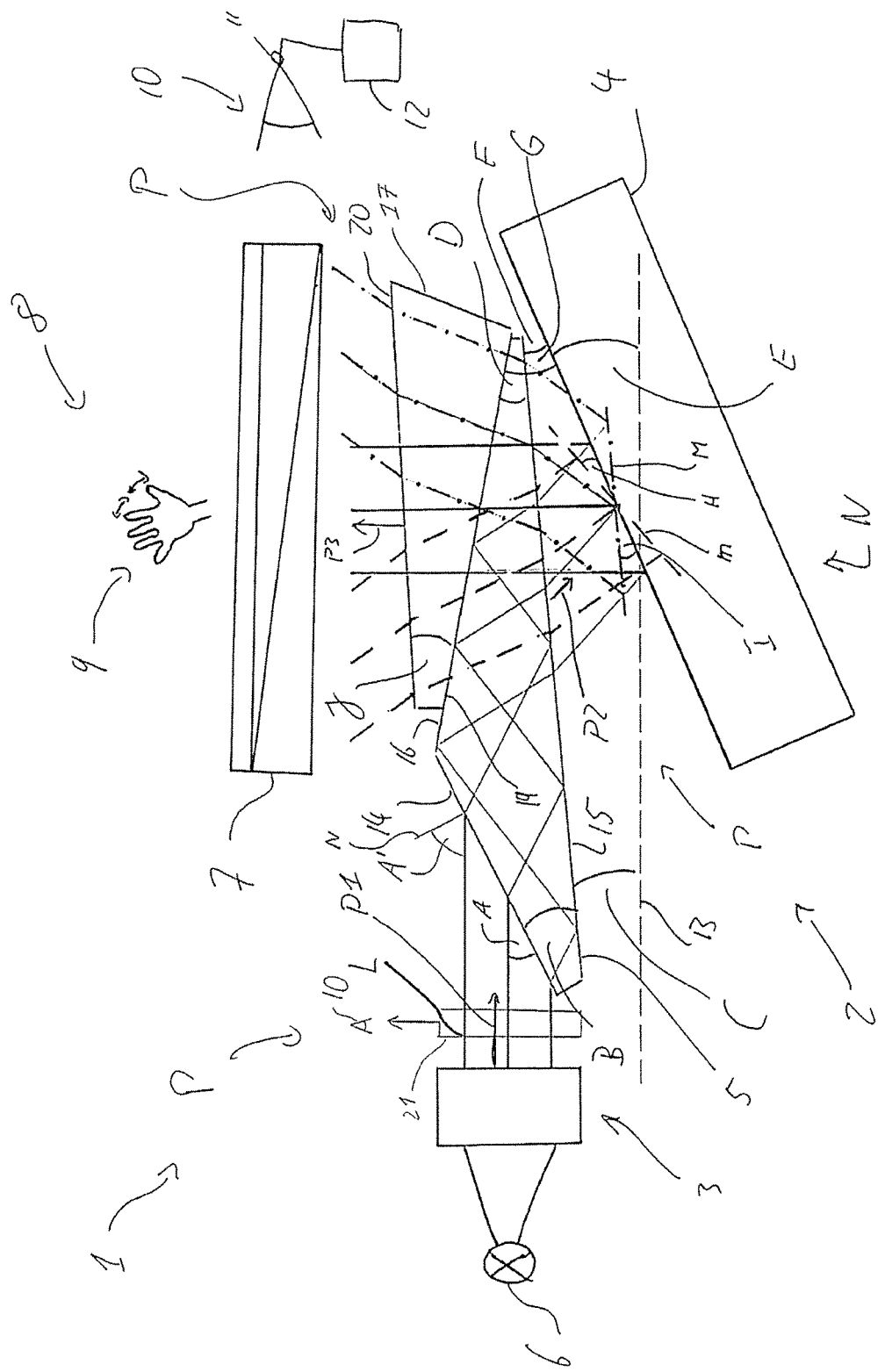

LIGHTING DEVICE FOR GESTURE RECOGNITION APPARATUS

FIELD OF INVENTION

The invention relates to a lighting device for detecting three-dimensional structures, in particular for a gesture recognition apparatus, for scanning an object with illumination light, wherein the lighting device comprises a tiltably supported reflective element and a first optical component for illuminating the reflective element with illumination light. In addition, the invention relates to a gesture recognition apparatus for optically recognizing gestures, having a lighting device, an illumination light source, from which an illumination light path extends to the lighting device, and having a sensor for receiving illumination light reflected during the performance of a gesture by an object performing the gesture in a detection region of the gesture recognition apparatus.

BACKGROUND

Lighting devices and gesture recognition apparatuses having such lighting devices are generally known. For example, optical gesture recognition apparatuses are used in devices which can be operated by the users thereof, for example mobile devices, for instance mobile phones or smartphones, tablet computers or laptop or notebook computers, in order to be able to operate said devices with the aid of gestures. In addition, gesture recognition apparatuses for optically recognizing gestures can also be provided in a television or a motor vehicle, in order to enable a user of the television or an occupant and, for example, the driver of the motor vehicle to operate the television or the motor vehicle by means of gestures.

Gesture recognition is the automatic recognition of gestures performed with an object. The object can, for example, be a person's hand. In principle, any posture and body movement can constitute a gesture. If, for example, the hand and, for instance, at least one finger of the hand is moved in a certain direction, this can constitute a gesture, which can result in a device being controlled. For example, moving a finger back and forth can correspond to scrolling screen content. Gestures can thereby be performed statically or dynamically, i.e. with or without motion. In order to optically recognize the gesture, the gesture recognition apparatus comprises the sensor which can, for example, be a CCD sensor of a camera. In order to be able to scan the object with the illumination light, the gesture recognition apparatus comprises the lighting device which scans the object, for example the hand, with illumination light. Scanning with illumination light means that the illumination light is guided, for example, in a given direction by means of the object. The illumination light reflected by the object is conducted to the sensor which generates a sensor signal and transmits it, for example, to a computing unit. The gesture is recognized in the computing unit on the basis of the sensor signal and an action can be executed. The computing unit can be a processor of a mobile device or, for example, a control unit for a motor vehicle.

As an alternative to gestures for controlling devices, other gestures, for example sign language performed with the hand, can also be recognized.

In order to minimize as far as possible or avoid distortion of the illumination light reflected with respect to the object caused by the tilting of the reflective element, a neutral location of the reflective element, about which the reflective element is tiltably supported, is aligned at an angle of 45 degrees with respect to the illumination light path between the first optical component and the reflective element. However, the lighting device requires a great deal of installation space at such an alignment. Installation space is limited in particular in the case of telephones and mobile computers, but also in motor vehicles.

The problem underlying the invention is therefore to provide a lighting device for a gesture recognition apparatus and a gesture recognition apparatus having a lighting device, wherein the lighting device has a compact construction and illuminates an object performing the gesture with low distortion.

SUMMARY

The problem is solved for the lighting device indicated above in that the lighting device comprises a prism, wherein the prism is arranged along the illumination light path, along which the illumination light extends from the first optical component to the reflective element, between the first optical component and the reflective element, and wherein the prism is configured such that the illumination light passes through the prism twice on its way to the reflective element and from the reflective element. The problem is solved for the gesture recognition apparatus indicated above in that the lighting device is a lighting device according to the invention.

The angle of incidence at the reflective element in the neutral location can be reduced by means of the prism, which leads to a reduction in the distortion and more uniform illumination. In addition, as a result of the prism, the neutral location of the reflective element can also result, at angles with respect to the illumination light path between the first optical component and the prism of less than 45 degrees and, for example, even less than 30 degrees, in sufficiently uniform illumination of the object with the illumination light.

The solution according to the invention can be further improved by different configurations which are advantageous per se and, unless otherwise executed, which can be combined as desired with each other. These embodiments and the advantages associated therewith will be dealt with below.

The prism can therefore comprise an entry surface facing the first optical component along the illumination light path, a base surface facing the reflective element along the illumination light path, and an exit surface facing away from the first optical component and the reflective element along the illumination light path. The illumination light path thereby extends from the first optical component through the entry surface and the base surface to the reflective element, and from the reflective element through the base surface and through the exit surface. The entry surface can be arranged tilted with respect to a portion of the illumination light path striking the entry surface such that the illumination light enters the prism through the entry surface. For example, the entry surface can be arranged tilted with respect to the portion of the illumination light path striking the entry surface by an angle of less than 30 degrees. Consequently, the portion of the illumination light path striking the entry surface can be arranged tilted by an angle of 30 degrees, 40 degrees or even more than 60 degrees with respect to the surface normal of the entry surface.

The angle between the entry surface and the base surface can be dimensioned such that illumination light conducted through the entry surface to the base surface is totally reflected on the base surface. As a result of the total reflection the light can be diverted without any losses and can be directed by an additional reflection in the prism towards the reflective element.

For example, the angle between the entry surface and the base surface can be less than 40 degrees.

The angle between the base surface and the exit surface can be dimensioned such that illumination light totally reflected by the base surface is totally reflected on the exit surface.

The angle between the base surface and the exit surface can be dimensioned such that illumination light totally reflected by the base surface passes through the base surface and strikes the reflective element.

For example, the angle between the base surface and the exit surface can be less than 40 degrees and, in particular, less than 20 degrees.

The neutral location of the reflective element with respect to the illumination light path between the first optical component and the prism can be less than 45 degrees and can be, for example, 40 degrees, 30 degrees or even 20 degrees and, for instance, 25 degrees.

Possible tilt angles of the reflective element with respect to the portion of the illumination light path striking the entry surface, with respect to the base surface or the exit surface can be dimensioned such that illumination light reflected by the reflective element passes through the base surface and through the exit surface. Angle ranges (field of view) of 60 times 40 degrees or 80 times 60 degrees or even greater are of interest for the application. This means a tilt angle range of half of the field to be illuminated in each axis for the reflective element.

Opposing maximum possible tilt angles of the reflective element can be designed such that illumination light reflected by the reflective element, when it is arranged at one of the maximum possible tilt angles, passes through the exit surface in a different direction to illumination light reflected by the reflective element, when the reflective element is arranged at the other of the maximum possible tilt angles.

The lighting device can comprise a second optical component, wherein the second optical component comprises the prism and an additional prism. The additional prism can lie in contact with the exit surface and can be configured to emit illumination light reflected by the reflective element arranged at the maximum possible tilt angles with a greater divergence than the exit surface. Furthermore, the additional prism makes it possible to generate a uniform angular velocity of the scanning illumination light, when the illumination light leaves the lighting device. In this case, uniformly means in relation to the tilting of the reflective element and symmetrically with the neutral position of the reflective element. The use of a plate (as a combination of the two prisms) is preferred, wherein the plate can be located perpendicularly to the illumination light transmitted in the neutral position. The angular range between the entry surface and the exit surface of the additional prism can be derived from the condition—total effect of the two prisms approximately similar to the plate, i.e. similar to the base surface and exit surface of the first prism.

Maximum possible tilt angles of the reflective element are those tilt angles at which the illumination light reflected by the reflective element passes through the exit surface of the prism and/or through an exit surface of the additional prism. By using the total reflection as a working principle within the first prism during the illumination of the reflective element it is possible to separate the illumination light of the reflective element and the return light from the reflective element in the optical path on a surface at which the beam paths are not yet spatially separated.

A beam splitter or a partially permeable mirror can be arranged along the illumination light path behind the exit surface of the prism or behind the exit surface of the additional prism, which beam splitter or partially permeable mirror conducts the illumination light into a region in which gestures of an object can be recognized by the gesture recognition apparatus. Illumination light reflected by the object is conducted through the beam splitter or the partially transparent mirror to the sensor.

For example, such a lighting device is suitable for also integrating a very compact receiving unit, wherein the receiving unit comprises the indicated unit having a polarizing beam splitter and a λ/4 plate, and the sensor. To this end, the unit for splitting beams can be installed in the region between the optical component which collimates, for example, the light of the light source, and the prism. The light source is preferably a laser diode and therefore radiates polarized light. If the unit, for example the polarizing beam splitter and the element for rotating the polarization (for example, a λ/4 plate) is then installed between the optical component and the prism, the transmitted light and the return light are separated and the return light is conducted to the sensor. Alternatively, an element for collimating the light can be installed between the polarizing beam splitter and the sensor.

The advantage of such a lighting device is the extreme compactness which can be achieved, since the return light is again conducted by means of the scanning reflective element and it is therefore possible to detect the location over the running time. Since the optical path for the sensor extends over the scanning reflective element, the received signal is only captured from a small area surrounding the transmission location and a good signal-to-noise ratio is achieved. This solution eliminates the need for a costly lens. An additional analyzer can preferably be installed between the optical component and the beam splitter, in order to improve the degree of polarization of the transmitted light.

The beam splitter can be omitted or can be replaced by a cover plate with this type of receiver. A different variant involves positioning a receiver next to the transmission unit. Since the installation height of the module is subject to extremely demanding requirements in practice (for instance if the lighting device is to be used for a mobile phone or a mobile computer, for instance a smartphone or a tablet PC,) the beam splitter 7 present in the variant shown is not absolutely essential.

BRIEF DESCRIPTION OF THE DRAWINGS

The invention will be explained below by way of example with reference to an embodiment with respect to the drawing. The different characteristics of the embodiment can thereby be combined independently of each other, as has already been explained in the case of the individual advantageous configurations, wherein:

FIG. 1 shows an embodiment example of a gesture recognition apparatus according to the invention, having a lighting device according to the invention.

DETAILED DESCRIPTION OF THE PREFERRED EMBODIMENTS

FIG. 1 diagrammatically shows a gesture recognition apparatus 1 according to the invention in a cutaway side view. The gesture recognition apparatus 1 comprises a lighting device 2 having a first optical component 3, a tilting reflective element 4 and a prism 5. In addition, the gesture recognition apparatus 1 comprises a light source 6 for generating illumination light L and a beam splitter 7. The beam splitter 7 conducts the illumination light L into a detection region 8. If an object 9 in the detection region 8 produces a gesture, the gesture recognition apparatus 1 can detect this gesture. Illumination light reflected by the object 9 arranged in the detection region 8 is conducted by the beam splitter 7 to a sensor 10, for example a CCD or a camera. The sensor 10 can output a sensor signal during operation by means of a signal output 11, which sensor signal is representative of the gesture performed with the object 9. During the operation of the gesture recognition apparatus 1, the sensor 10 outputs the sensor signal by means of the signal output 11, for example to a computing device 12, in which it is determined by means of the sensor signal which gesture has been performed by the object 9. The computing device 12 can be part of the gesture recognition apparatus 1. Alternatively, the computing device 12 can be part of a different device, for example part of a mobile phone, a computer, a television or a control unit for a motor vehicle.

The first optical component 3 is connected in series to the light source 6 and can comprise, for example, a collimator for generating a parallel beam path of illumination light L generated with the light source 6. The illumination light L emitted by the first optical component 3 is shown by three lines which are aligned parallel to one another and which extend from the first optical component 3 to the prism 5. Running parallel to these lines is the portion P1 of the illumination light path P which extends from the first optical component 3 to the prism 5. A dashed line 13 runs parallel to the illumination light path P between the first optical component 3 and the prism 5 and is shown arranged offset with respect to the illumination light path P, in order to indicate angles.

The prism 5 comprises an entry surface 14 which faces the first optical component 3 along the portion P1. In addition, the prism 5 comprises a base surface 15 which faces the reflective element 4 along a portion P2 of the illumination light path P which extends from the prism 5 to the reflective element 4. In addition, the prism 5A comprises an exit surface 16, which points away from the entry surface 14 and the base surface 15. The exit surface 16 can point away from the tilting reflective element 4 along the second illumination light path portion P2. For example, the exit surface 16 points along a third illumination light path portion P3, which extends from the prism 5 to the beam splitter 7, towards the beam splitter 7.

The entry surface 14 can be arranged tilted with respect to the portion P1 of the illumination light path P striking the entry surface 14 such that the illumination light L enters the prism 5 through the entry surface 14. For example, the entry surface 14 is arranged tilted with respect to the portion P1 about an angle A of less than 30 degrees. An angle A' between the portion P1 and the surface normal N is therefore calculated as 90 degrees minus angle A, so that angle A' can, for example, be 30 degrees, up to 40 degrees or even up to 60 degrees.

Angle B between the entry surface 14 and the base surface 15 can be dimensioned such that illumination light L passing through the entry surface 14, after it has struck the entry surface 14 at angle A, is conducted to the base surface 15, and illumination light L conducted to the base surface 15 is totally reflected on the base surface 15. Angle B can be less than 60 degrees or even less than 30 degrees.

Angle C between the base surface 15 and the portion P1 of the illumination light path P or the dotted line 13 can be within a range of between 0 degrees and 30 degrees.

In addition, angle D between the base surface 15 and the exit surface 16 can be dimensioned such that illumination light L totally reflected by the base surface 15 is totally reflected on the exit surface 16. In addition, angle D can be dimensioned such that illumination light totally reflected by the exit surface 16 passes through the base surface 15 and strikes the reflecting element 4.

To ensure that the illumination light L is totally reflected on the surface 16, an air gap may be provided between the prisms 5 and 17 on the surface 16

For example, angle D between the base surface 15 and the exit surface 16 is less than 40 degrees and, in particular, less than 20 degrees.

The tilting reflective element 4 is shown with a solid line in its neutral location or position N. In its neutral location N, angle E between the reflective element and the dashed line 13 can be less than 45 degrees and can be, for example, between 20 degrees and 40 degrees. For example, angle E is 35 degrees or even just 25 degrees.

Angle F between the reflective element 4 in its neutral location N and the base surface 15 of the prism 5 is produced by angles C and E. Angle G between the reflective element 4 in its neutral location N and the exit surface 16 is produced, taking into account angles C, E and D.

In addition, the FIGURE indicates the maximum tilted location M and the minimum tilted location m of the tilting reflective element 4 by dotted or dot-dashed lines. The angle of the maximum tilted location M of the reflective element 4 with respect to the neutral location N is provided with the reference numeral H and the angle of the minimum tilted location m of the reflective element 4 is provided with the reference numeral I. The neutral location N can therefore be arranged centrally or eccentrically between the maximum and minimum tilted locations M, m.

The illumination light L is shown up to the point it strikes the reflective element 4 with solid lines. After being reflected on the reflective element 4, the illumination light L continues to be shown as solid lines, when the reflective element 4 is shown in its neutral location N. When the reflective element 4 is shown in its maximum tilted location M, not only is the reflective element 4, but also the reflected illumination light L is shown with dot-dashed lines. In the case of a tilted reflective element 4 in its minimum tilted location m, the reflective element 4 and the reflected illumination light L are shown with dashed lines.

The maximum tilt angle H and the minimum tilt angle I can be referred to as the maximum possible tilt angles of the reflective element 4.

Angles in a closed interval with the maximum and minimum tilt angles H, I of the reflective element 4 with respect to the neutral location N thereof can be designed as end values such that illumination light L reflected by the reflective element 4 passes through the base surface 15 and through the exit surface 16. In addition, the tilt angles of the reflective element 4 with respect to the portion of the illumination light path P1 striking the entry surface 14, with respect to the base surface 15 and/or the exit surface 16 are dimensioned such that illumination light L reflected by the reflective element 4 passes through the base surface 15 and through the exit surface 16.

The opposing maximum possible tilt angles H, I of the reflective element 4 can be designed such that illumination light L reflected by the reflective element 4, when it is arranged at one of the maximum possible tilt angles H, I passes through the exit surface 16 in a different direction to illumination light 4 reflected by the reflective element, when the reflective element 4 is arranged at the other of the maximum possible tilt angles I, H.

The lighting device 2 can comprise an additional prism 17 which can configure a second optical component 18 together with the prism 5. The additional prism 17 can lie in contact in a planar or flush manner with the exit surface 16 or can be arranged with an air gap with respect to the exit surface 16 and can be configured to emit illumination light L reflected by the reflective element 4 arranged at the maximum possible tilt angles H, I with a greater divergence than the exit surface 16. In particular, the additional prism 17 can comprise a base surface 19 which lies in contact with the exit surface 16. Reflected illumination light L enters the additional prism 17 through the base surface 19. The additional prism 17 can be designed such that the reflected illumination light L, which has entered the additional prism 17 through the base surface 19 without being reflected on one of the surfaces of the additional prism 17, exits through an exit surface 20 of the additional prism 17 lying opposite the base surface 19. The base surface 19 and the exit surface 20 are arranged at an angle J with respect to one another. Similarly to angle D, angle J may be within a range of 10 to 40 degrees.

The beam splitter 7 can follow the exit surface 20 along the portion P3 of the illumination light path P.

For example, when the reflective element 4 is arranged in its neutral location N, the illumination light L can exit perpendicularly to the exit surface 20 or to the line 13 from the latter and define the direction of the portion P3 of the illumination light path P.

The maximum tilt angle H and the minimum tilt angle I can be equal in terms of size and can comprise different signs. Alternatively, the two tilt angles H, I can comprise different amounts and have different or the same signs. The maximum and the minimum tilt angles can be in the range of up to 10 degrees, up to 20 degrees or even up to 30 degrees, or larger. Beam deflections at the reflective element of, for example, 20 degrees, 40 degrees or even 60 degrees would arise, which would then, depending on the configuration of the lighting unit 2, correspond to a field angle for the lighting of 40, 80 or even 120 degrees.

For example, the lighting device is suitable for also integrating a very compact receiving unit. To this end, a unit 21 for splitting beams can be installed in the region between the optical component 3, which collimates the light of the light source 6, and the prism 5. The light source 6 is preferably a laser diode and therefore radiates polarized light. If the unit 21, for example a polarizing beam splitter and an element for rotating the polarization (for example, a λ/4 plate), is then installed between the optical component 3 and the prism 5, the transmitted light and the return light can be separated and the return light can be conducted to the sensor 10. Alternatively, an element for collimating the light can also be installed between the polarizing beam splitter and the sensor 10.

The advantage of such a lighting device is the extreme compactness which can be achieved, since the return light is again conducted by means of the scanning reflective element 4 and it is therefore possible to detect the location over the running time. Since the optical path for the sensor 10 extends over the scanning reflective element 4, the received signal is only captured from a small area surrounding the transmission location and a good signal-to-noise ratio is achieved. This solution eliminates the need for a costly lens. An additional analyzer can preferably be installed between the optical component 3 and the beam splitter, in order to improve the degree of polarization of the transmitted light.

The beam splitter can be omitted or replaced by a cover plate with this type of receiver 7. A different variant involves positioning a receiver next to the transmission unit. Since the installation height of the module is subject to extremely high requirements in practice (for instance when the lighting device is used for a mobile phone or a mobile computer, for instance a smartphone or a tablet PC), the beam splitter 7 present in the variant shown is not absolutely essential.

What is claimed is:

1. A lighting device for detecting three-dimensional structures, in particular for a gesture recognition apparatus, for scanning an object with illumination light (L), the lighting device comprising:
   a tiltably supported reflective element;
   a first optical component for illuminating the reflective element with the illumination light (L); and
   a prism, the prism comprising:
      an entry surface facing the first optical component along an illumination light path (P);
      a base surface facing the reflective element along the illumination light path (P), and
      an exit surface facing away from the first optical component and the reflective element along the illumination light path (P),
      wherein the entry surface is arranged tilted with respect to a portion (P1) of the illumination light path striking the entry surface such that the illumination light (L) enters the prism through the entry surface,
   wherein the prism is arranged along the illumination light path (P), along which the illumination light (L) extends from the first optical component to the reflective element, between the first optical component and the reflective element, and
   wherein the prism is configured such that the illumination light (L) passes through the prism twice on its way to the reflective element and from the reflective element.

2. The lighting device according to claim 1, wherein an angle (B) between the entry surface and the base surface is dimensioned such that the illumination light (L) conducted through the entry surface to the base surface is totally reflected on the base surface.

3. The lighting device according to claim 2, wherein the angle (B) between the entry surface and the base surface is less than 40 degrees.

4. The lighting device according to claim 1, wherein an angle (D) between the base surface and the exit surface is dimensioned such that illumination light (L) totally reflected by the base surface is totally reflected on the exit surface.

5. The lighting device according to claim 4, wherein the angle (D) between the base surface and the exit surface is dimensioned such that the illumination light (L) totally reflected by the exit surface passes through the base surface and strikes the reflective element.

6. The lighting device according to claim 4, wherein the angle (D) between the base surface and the exit surface is less than 40 degrees.

7. The lighting device according to claim 5, wherein the angle (D) between the base surface and the exit surface is less than 40 degrees.

8. The lighting device according to claim 1, wherein tilt angles (E, F, G) of the reflective element with respect to the portion (P1) of the illumination light path (P) striking the entry surface, with respect to the base surface or the exit surface are dimensioned such that illumination light (L)

reflected by the reflective element passes through the base surface and through the exit surface.

9. The lighting device according to claim 8, wherein opposing maximum and minimum possible tilt angles (H, I) of the reflective element are designed such that illumination light (L) reflected by the reflective element when the reflective element is arranged at the maximum possible tilt angle (H) passes through the exit surface in a different direction to illumination light (L) reflected by the reflective element when the reflective element is arranged at the minimum possible tilt angle (I).

10. The lighting device according to claim 9, further comprising:
   a second optical component, wherein the second optical component comprises an additional prism, wherein the additional prism lies directly in contact with the exit surface or is separated from the exit surface by an air gap and is configured to emit the illumination light (L) reflected by the reflective element arranged at the maximum and minimum possible tilt angles (H, I) with a greater divergence than the exit surface.

11. A gesture recognition apparatus for optically recognizing gestures, comprising:
   a lighting device according to claim 1; and
   an illumination light source from which an illumination light path (P) extends to the lighting device, and having a sensor for receiving illumination light (L) reflected during the performance of a gesture from an object performing the gesture in a detection region of the gesture recognition apparatus.

12. The gesture recognition apparatus according to claim 11, wherein a unit for beam splitting having a polarizing beam splitter and a .A/4-plate is located between the optical component and the prism, and a return light from the detection region is conducted through the unit to the sensor.

* * * * *